Figure 1:
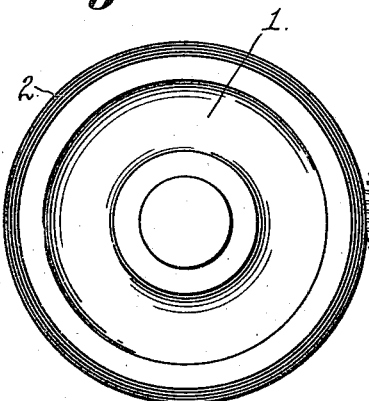

W. C. ANDERSON.
RAISIN SEEDER.
APPLICATION FILED JAN. 17, 1910.

976,247.

Patented Nov. 22, 1910.

WITNESSES.
Arthur L. Slee.
S. Constine.

INVENTOR.
William C. Anderson
by Wm. F. Booth
his Attorney.

THE NORRIS PETERS CO., WASHINGTON, D. C.

UNITED STATES PATENT OFFICE.

WILLIAM C. ANDERSON, OF SAN JOSE, CALIFORNIA.

RAISIN-SEEDER.

976,247.

Specification of Letters Patent. Patented Nov. 22, 1910.

Application filed January 17, 1910. Serial No. 538,390.

*To all whom it may concern:*

Be it known that I, WILLIAM C. ANDERSON, a citizen of the United States, residing at San Jose, in the county of Santa Clara and State of California, have invented certain new and useful Improvements in Raisin-Seeders, of which the following is a specification.

My invention relates to that class of seeding machines for raisins and other fruit in which an impaling roll, provided with spaced circumferential rows of teeth, operates in conjunction with an opposing presser roll, to force out the seeds while impaling the pulp. In machines of this type, in addition to feeding devices for directing the fruit between the rolls, and devices or means for flicking or scraping the seeds off the points of the teeth, there are other devices, commonly termed pulp-strippers, which operate in the spaces between the circumferential rows of impaling teeth or pins, to remove the meat or pulp of the fruit from upon and between said teeth or pins.

My present invention particularly concerns the pulp-strippers and its object is to provide simple means to hold the strippers in place, each with its own individual yielding pressure, and to provide an adjustment for said pressure.

It is well known that a good pulp stripper is highly important in this class of machines, and experience has taught that a form of stripper supported from a point above the impaling roll and having its functionally operative end concaved to lie for an appreciable length of arc in the circumferential space between the rows of teeth or pins, the extremity of the stripper being brought down to a chisel-like edge which hugs closely to the bottom of the space, is about the best form of a blade for this purpose, in that it reaches under and keeps below the fruit pulp and effectually removes it and keeps the teeth and the spaces between them clean. These strippers have heretofore, however, been mounted at their upper ends upon a supporting shaft in such a way that while they could slide laterally on the shaft, they had no pivotal movement thereon, being checked by rods or bars serving the purpose of feathers or ribs similar to the mounting of sliding clutches on shafts. It was necessary therefore, in order to adjust and hold the strippers to place in the circumferential spaces of the impaling roll to give the supporting shaft an adjustment on its axis, the result being that all the strippers were moved and adjusted in unison, and no one blade had any adjustment or relief of its own. This is not good, for as the blades wear differently, each should have its own adjustment to compensate for its individual wear, so that it will remain at all times in proper position, cosely hugging the bottom of the space in which it operates and each should have its own relief under obstructions or inequalities which it may meet, in said space; and these provisions will result not only in better work, but also in lengthening the life of the stripper series as a whole, as well worn blades need not be discarded in order to restore equality to the series.

With this object in view, my invention consists in connection with strippers of this general type, of means for holding the strippers to their work with a yielding pressure of such a nature as to permit each stripper to have its own individual adjustment and relief, all as I shall now set forth in the claims and fully describe by reference to the accompanying drawings in which—

Figure 2:
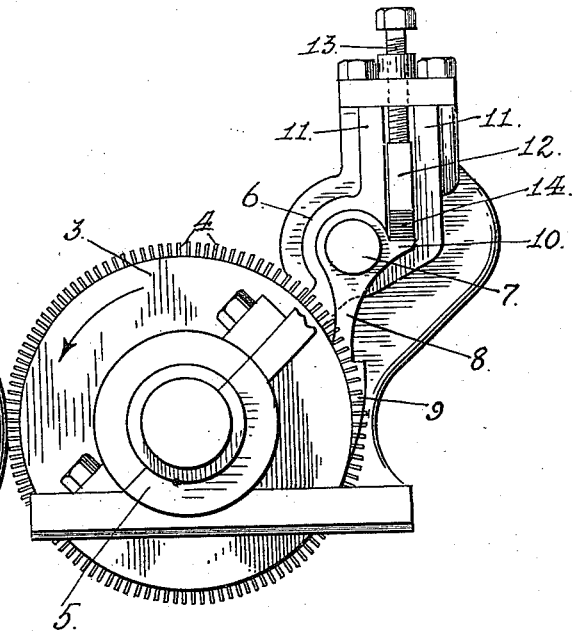
Figure 2:
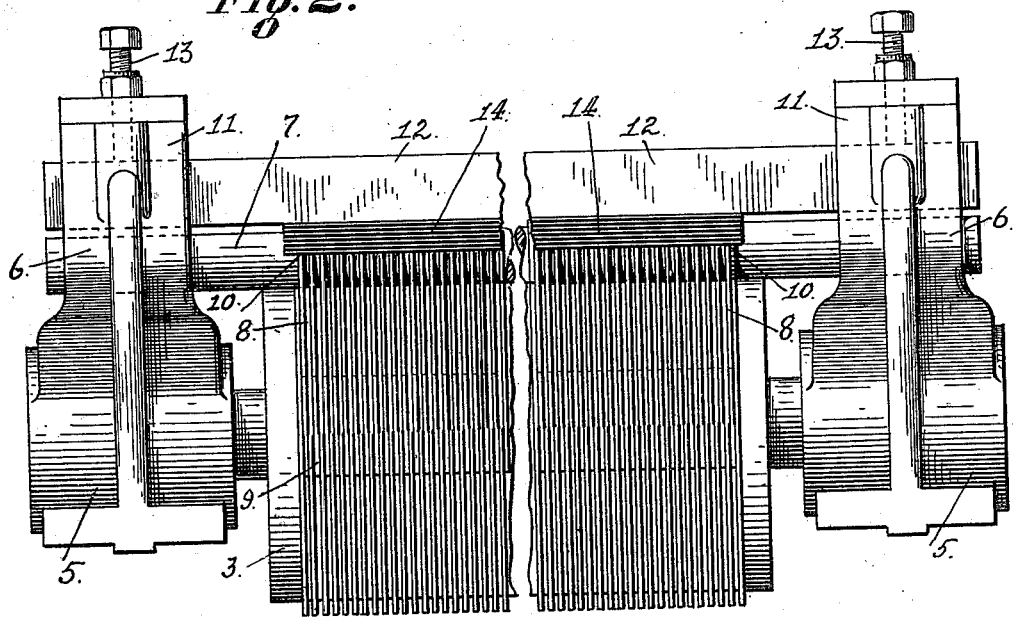

Figure 1 is an end view of a presser roll, and an impaling roll, the box at the near end being broken away in order to show the first of the series of stripper blades and the means for controlling it. Fig. 2 is a broken elevation from the rear of the impaling roll, showing the series of stripper blades and the adjustable resilient pressure means. In this figure the pins or teeth of the impaling roll are omitted, in order to avoid confusion.

1 is the presser roller of usual construction, which involves a yielding periphery 2 as is common.

3 is the impaling roll, which rotates in the direction of the arrow in Fig. 1.

As is usual in this class of machines, the raisins or other fruit are to be fed between the two rolls, and the excluded seeds are to be knocked or scraped off. The devices for these purposes, together with other parts of the machine are not here shown as they form no part of my invention.

The impaling roll is provided with teeth or pins 4 which as usual lie in circumferential spaced rows and are set close enough together to exclude the seeds from between the teeth or pins, whereby said seeds are driven out from the pulp, and the latter is impaled upon the teeth.

The boxes 5 of the impaling roll are extended to form other boxes 6 for a rod 7, which lies back of and slightly above the roll.

8 are the pulp-stripper blades. These, at their upper ends are each independently pivotally mounted upon the rod 7, so that each blade may individually turn on said rod as an axis. Each blade is formed as shown in Fig. 1, having its lower portion 9 concaved on an arc of considerable length, so that it lies between adjacent pin-rows and hugs the bottom of the space between the rows. The extremity of the blade is brought down to a chisel-like end, which lies closely against the bottom of the space. The upper end of each blade is formed with a rear shoulder or heel 10.

The boxes 6 are further carried up as plates 11, to form end guides for the vertically adjustable bar 12, which is acted upon by adjusting screws 13 at each end. The bar 12 extends between the two end guides 11 and has secured to its lower edge a cushion bar 14 preferably made of rubber. This cushion bar presses down upon the heels or shoulders 10 of all the stripper blades as seen in Fig. 2. When all the strippers are new the adjusting bar 12 is initially set down by the screws 13 to such an extent as to cause the cushion bar 14 to press all the strippers to their proper positions. Each stripper can yield individually against said cushion. Those that wear first, are, however, still kept to place by said cushion bar, and the entire series thus remains operative. When necessary, the adjusting bar 12 may be set down further to compensate for more general wear.

With this construction, all the advantages, which I have heretofore indicated, are attained. Each stripper is held in perfect place and its wear compensated for independently of the others. Each has its own relief before inequalities and obstructions, and all the strippers as a series may be continued to be used without regard to relative wear.

Having thus described my invention what I claim as new and desire to secure by Letters Patent is:—

1. In a raisin-seeder, and in combination with an impaling roll having teeth arranged in circumferential spaced rows, a pulp-stripping device composed of independent blades the lower ends of which lie in the spaces between the rows of teeth of the impaling roll, each of said blades having a shoulder on the back of its upper portion, a fixed rod upon which each of said blades is independently pivoted at its upper end, a cushion bar of resilient material common to and bearing upon the shoulders of all the blades of the stripper, and means for adjusting the pressure of said cushion bar upon said shoulders.

2. In a raisin-seeder, and in combination with an impaling roll having teeth arranged in circumferential spaced rows, a pulp-stripping device composed of independent blades the lower ends of which lie in the spaces between the rows of teeth of the impaling roll, each of said blades having a shoulder on the back of its upper portion, a fixed rod upon which each of said blades is independently pivoted at its upper end, a cushion bar of resilient material common to and bearing upon the shoulders of all the blades of the stripper, a vertically adjustable bar carrying said cushion bar, and means for adjusting said cushion-carrying bar.

3. In a raisin-seeder, the combination of an impaling roll having teeth arranged in circumferential spaced rows; suitable end boxes in which said roll is journaled, said boxes having extensions in which are formed other boxes, and a vertical guide; a pulp stripping device composed of independent blades the lower ends of which lie in the spaces between the rows of teeth of the impaling roll, each of said blades having a shoulder on the back of its upper portion; a fixed rod mounted in the boxes of the extensions of the roll boxes, upon which rod each of said stripper blades is independently pivoted at its upper end; a vertically adjustable bar mounted in the guide of said box extensions; means for adjusting said bar; and a cushion carried by the lower edge of said bar and bearing on the shoulders of all the stripper blades.

4. In a raisin-seeder, and in combination with an impaling roll having teeth arranged in circumferential spaced rows, a pulp-stripping device composed of independent blades the lower ends of which lie in the spaces between the rows of teeth of the impaling roll, each of said blades having a shoulder on the back of its upper portion, a fixed rod upon which each of said blades is independently pivoted at its upper end, means acting against the shoulders of said blades for holding each blade with independent resilient pressure in its position in the spaces between the rows of teeth of the impaling roll and an adjusting device for said resilient pressure means.

5. In a raisin-seeder, and in combination with an impaling roll having teeth arranged in circumferential spaced rows, a pulp-stripping device composed of independent blades the lower ends of which lie in the spaces between the rows of teeth of the impaling roll, a fixed rod upon which each of said blades is independently pivoted at its upper end, and a cushion bar of resilient material, common to all said blades, for holding each blade independently in its position in the spaces between the rows of teeth.

In testimony whereof I have signed my name to this specification in the presence of two subscribing witnesses.

WILLIAM C. ANDERSON.

Witnesses:
 WM. F. BOOTH,
 D. B. RICHARDS.